(12) United States Patent
Benslimane

(10) Patent No.: US 12,050,144 B2
(45) Date of Patent: Jul. 30, 2024

(54) SENSOR ARRANGEMENT FOR MEASURING THE PRESSURE AND TEMPERATURE OF REFRIGERANT A FLUID

(71) Applicant: Danfoss A/S, Nordborg (DK)

(72) Inventor: Mohamed Benslimane, Nordborg (DK)

(73) Assignee: DANFOSS A/S, Nordborg (DK)

( * ) Notice: Subject to any disclaimer, the term of this patent is extended or adjusted under 35 U.S.C. 154(b) by 279 days.

(21) Appl. No.: 17/635,066

(22) PCT Filed: Aug. 12, 2020

(86) PCT No.: PCT/EP2020/072607
§ 371 (c)(1),
(2) Date: Feb. 14, 2022

(87) PCT Pub. No.: WO2021/032564
PCT Pub. Date: Feb. 25, 2021

(65) Prior Publication Data
US 2022/0291067 A1    Sep. 15, 2022

(30) Foreign Application Priority Data
Aug. 21, 2019 (DE) .......................... 102019122538.8

(51) Int. Cl.
*G01L 19/00* (2006.01)
*G01K 13/02* (2021.01)
(Continued)

(52) U.S. Cl.
CPC .......... *G01L 19/0092* (2013.01); *G01K 13/02* (2013.01); *G01L 9/0041* (2013.01);
(Continued)

(58) Field of Classification Search
None
See application file for complete search history.

(56) References Cited

U.S. PATENT DOCUMENTS

| | | |
|---|---|---|
| 8,935,961 B2 | 1/2015 | Papadeas et al. |
| 2004/0134282 A1* | 7/2004 | Hayashi ............. G01L 19/0092 73/708 |
| 2019/0011063 A1 | 1/2019 | Braun et al. |

FOREIGN PATENT DOCUMENTS

| | | |
|---|---|---|
| CN | 1673703 A | 9/2005 |
| CN | 102812224 A | 12/2012 |

(Continued)

OTHER PUBLICATIONS

International Search Report for PCT/EP2020/0702607 Dated Nov. 6, 2020.

*Primary Examiner* — Brandi N Hopkins
*Assistant Examiner* — Nigel H Plumb
(74) *Attorney, Agent, or Firm* — McCormick, Paulding & Huber PLLC

(57) ABSTRACT

A sensor arrangement for measuring the pressure and temperature of a fluid includes a housing, a pressure sensor element, and a temperature sensor case. The housing includes a passage and a fluid opening, the passage and the fluid opening being in fluid communication. The pressure sensor element is connected to the housing, the pressure sensor element being in fluid communication with the passage. The temperature sensor case includes at least one temperature sensor element, the temperature sensor case being at least partially arranged in the passage. The sensor arrangement further includes an attachment element, wherein the attachment element attaches the temperature sensor case to the passage. The sensor arrangement further includes a fluid channel extending at least in part between the housing and the temperature sensor case, the fluid channel passing the attachment element and being in fluid communication with the fluid opening and the pressure sensor element.

15 Claims, 2 Drawing Sheets

(51) Int. Cl.
*G01L 9/00* (2006.01)
*G01L 19/14* (2006.01)
G01L 9/06 (2006.01)
G01L 9/08 (2006.01)

(52) U.S. Cl.
CPC ...... *G01L 19/0038* (2013.01); *G01L 19/0084* (2013.01); *G01L 19/143* (2013.01); *G01L 9/06* (2013.01); *G01L 9/08* (2013.01)

(56) References Cited

FOREIGN PATENT DOCUMENTS

| | | |
|---|---|---|
| CN | 104204757 A | 12/2014 |
| CN | 108801335 A | 11/2018 |
| DE | 197 45 244 A1 | 4/1998 |
| DE | 102014215752 A1 | 4/2002 |
| EP | 1 790 964 A1 | 5/2007 |

* cited by examiner

SENSOR ARRANGEMENT FOR MEASURING THE PRESSURE AND TEMPERATURE OF REFRIGERANT A FLUID

CROSS-REFERENCE TO RELATED APPLICATION

[0000.1] This application is a National Stage application of International Patent Application No. PCT/EP2020/072607, filed on Aug. 12, 2020, which claims priority to German Application No. 102019122538.8 filed on Aug. 21, 2019, each of which is hereby incorporated by reference in its entirety.

TECHNICAL FIELD

The invention relates to a sensor arrangement for measuring the pressure and temperature of a fluid.

BACKGROUND

Some measuring tasks require measurements of different physical properties of a medium. Combined sensors are used to provide those measurements. Those combined sensors use less space than several single sensors. Sensor arrangements for measuring the pressure and temperature of a fluid are widely used to determine both the pressure and the temperature of a fluid, e.g. of a refrigerant flowing within a cooling system.

From DE 10 2014 215 752 A1, it is known to provide a pressure and temperature sensor arrangement with a wide fluid passage formed in the pressure connector part. A tube element of a temperature sensor extends from a mounting portion of the connector part through the fluid passage and protrudes with its closed end from the opening of the fluid passage. The tube element connects to the mounting portion of the connector part by form-fitting and press-fitting.

From U.S. Pat. No. 8,935,961 B2 a sensor arrangement is known comprising a temperature sensor tube extending through a fluid passage of a connector. In one embodiment, the tube is attached to the opening of a separate passage formed in the pressure connector, which is distinct from the fluid passage providing fluid connection to the pressure sensor. In another embodiment, the temperature sensor is arranged in a hollow space between a tubular section in a cylindrical bore of the connector and the inner wall of the cylindrical bore. The tubular section comprises the fluid passage.

The known sensor arrangements require a certain size of the pressure connector to accommodate the fluid passage and the temperature sensor tube or require several manufacturing steps. Due to spatial constraints and/or cost requirements, there may be a need to reduce the size, especially the diameter of such sensor devices.

SUMMARY

Thus, the technical object may be providing an improved sensor arrangement for measuring the pressure and temperature of a fluid that comprises a reduced size and that is cost-efficient.

Claim 1 indicates the main features of the invention. Features of embodiments of the invention are subject of claims 2 to 15.

In an aspect of the invention, a sensor arrangement for measuring the pressure and temperature of a fluid is provided, the sensor arrangement comprising a housing, a pressure sensor element, and a temperature sensor case, wherein the housing comprises a passage and a fluid opening, the passage and the fluid opening being in fluid communication, wherein the pressure sensor element is connected to the housing, the pressure sensor element being in fluid communication with the passage, wherein the temperature sensor case comprises at least one temperature sensor element, the temperature sensor case being at least partially arranged in the passage, wherein the sensor arrangement further comprises an attachment element, wherein the attachment element attaches the temperature sensor case to the passage, wherein the sensor arrangement further comprises a fluid channel extending at least in part between the housing and the temperature sensor case, the fluid channel passing the attachment element and being in fluid communication with the fluid opening and the pressure sensor element.

The invention provides a sensor arrangement for measuring the pressure and the temperature of a fluid, wherein the temperature sensor case is attached to the passage by an attachment element. The attachment element is arranged in the passage between the temperature sensor element and the passage. The attachment element and the temperature sensor case reduce the free space in the passage. In particular, due to the attachment between the attachment element and the temperature sensor case, the attachment element spans from an inner wall of the passage of the housing to the temperature sensor case Thus, at the position of the attachment element, the free space in the passage is minimal, such that the passage may be blocked. The fluid channel being formed between the passage and the temperature sensor case passes the attachment element. Hence, the fluid channel provides a fluid communicating connection around or through the attachment element along the passage. The fluid channel therefore provides a fluid communication between the pressure sensor element and the fluid opening. A fluid may therefore flow through the fluid opening and the fluid channel to the pressure sensor element. The fluid channel may be small in relation to the prior art such that fluid channel does not require much space in the housing and the passage. Due to the fluid channel that circumvents the position of the attachment element, the sensor arrangement for measuring the pressure and temperature of the fluid may be minimized, further. Furthermore, the sensor arrangement may be manufactured in a cost-efficient way since the number of manufacturing steps and the number of parts are reduced.

The temperature sensor case may comprise a temperature sensor element, which is arranged inside the temperature sensor case. The temperature sensor case therefore protects the temperature sensor element from the fluid.

In an example, the temperature sensor case may comprise at least a portion of the fluid channel.

A portion of the fluid channel may therefore be a part of the temperature sensor case. The temperature sensor case may define that portion of the fluid channel. Since the fluid channel extends between the temperature sensor case and the passage, at least one wall of the fluid channel is provided by the passage. The temperature sensor case provides a further wall of the fluid channel.

In a further example, the fluid channel may comprise a channel portion being a recess on the temperature sensor case.

A recess in the temperature sensor case may be manufactured on an outside wall of the temperature sensor case. The recess may be shaped into the wall of the temperature sensor case, for example by cutting a groove into the temperature sensor case. The size and length of the recess may be adapted to the fluid and the properties of the fluid that shall flow through the fluid channel. The manufacturing of the recess, i.e. the portion of the fluid channel, is simple and cost efficient. Since the attachment element may reach from the passage to the temperature sensor case a recess in the temperature sensor case may be out of reach of the attachment element such that the fluid channel circumvents the attachment element.

In that example, the fluid channel may comprise a channel portion being a deformation on the temperature sensor case.

The fluid channel may also comprise a portion being a deformation on the temperature sensor case. The deformation may for example be manufactured by pushing a portion of the temperature sensor case into the temperature sensor case. The size and length of that portion of the fluid channel may be adapted to the fluid and the properties of the fluid that shall flow through the fluid channel. Such a deformation is easy to manufacture and provides a portion of the fluid channel that may pass the attachment element, when the temperature sensor case is arranged in the passage of the sensor arrangement.

In another example, at least one portion of the fluid channel may be arranged between the temperature sensor case and the attachment element, wherein at least one further portion of the fluid channel is arranged between the temperature sensor case and the passage.

Thus, the fluid channel is defined by the temperature sensor case and both the passage and the attachment element. At the position of the attachment element, the fluid channel extends between the attachment element and the temperature sensor case. At further positions in the passage, the fluid channel extends between the temperature sensor case and the passage. The fluid channel may be solely defined by the temperature sensor case at positions, which are outside of the passage.

Furthermore, in an example, the housing may comprise a connector element and a plate element, wherein the passage and the fluid opening are arranged on the connector element, wherein the plate element closes the passage on an end portion of the passage, the end portion being opposite to the fluid opening, and wherein the pressure sensor element is arranged on the plate element.

The housing may therefore comprise at least two parts, i.e. the connector element and the plate element. The connector element comprises a passage, which has two open end sections. One of the open end sections is the fluid opening. The other open end section may be closed by the plate element. The pressure sensor element may be arranged on the plate element such that the pressure sensor element is in fluid communication with the passage. This provides an easy to manufacture housing for the sensor arrangement.

In a further example, the temperature sensor case may extend through the plate element, wherein the temperature sensor case and the plate element comprise a sealing connection between each other.

The temperature sensor case may comprise an opening at the section, which extends through the plate element. The temperature sensor element being arranged in the temperature sensor case may comprise signal wires, which extend through that opening The connection between the temperature sensor case and the plate element may have sealing properties such that a fluid in the passage may not flow along the temperature sensor case through the plate element.

In an example, the attachment element may be an annular flange in the passage, the annular flange extending around a passage portion, wherein the temperature sensor case comprises an outer diameter that fills the passage portion.

The annular flange therefore comprises an inner diameter, which corresponds to the outer diameter of the temperature sensor case. The temperature sensor case and the annular flange therefore completely fill the diameter of the passage except at the position of the fluid channel. The fluid channel that extends between the temperature sensor case and the annular flange therefore locally reduces the outer diameter of the temperature sensor case. At the position of the fluid channel, the annular flange does not contact the temperature sensor case. The manufacturing of an annular flange as attachment element is simple and cost-efficient.

In another example, the attachment element may comprise at least one protrusion from the inner wall of the passage. The at least one protrusion may have the shape of a finger which bridges the distance between the inner wall of the passage and the outer wall of the temperature sensor case. The finger does not extend around the complete temperature sensor case such that at the position for the attachment element, the attachment element, the passage and the temperature sensor case may border the fluid channel.

Furthermore, in an example, the attachment element may be arranged at the fluid opening.

By attaching the attachment element at the fluid opening, the connection between the temperature sensor case and the attachment element may be provided through the fluid opening. Thus, the manufacturing of the sensor arrangement is improved. Furthermore, by choosing the extension of the attachment element along the passage, the fluid channel may be adapted to the fluid, which shall flow through the fluid channel.

In another example, the attachment element may be arranged between the fluid opening and the pressure sensor element.

The arrangement of the attachment element between the fluid opening and the pressure sensor element means, that the attachment element is arranged at a distance from the fluid opening in the passage. The attachment element may then for example divide the passage into two passage sections. The first passage section extends between the fluid opening and the attachment element. The further passage extends between the attachment element and the pressure sensor element. By choosing the position and the extension of the attachment element along the passage, the fluid channel may be adapted to the fluid, which shall flow through the fluid channel.

In an example, the fluid channel may comprise a channel portion being arranged outside of the passage.

In this case, the fluid channel is solely defined by the temperature sensor case. The fluid channel then extends through the fluid opening into the passage.

Furthermore, in another example, the fluid channel may comprise a channel portion that is arranged on a tip of the temperature sensor case, the tip extending through the fluid opening out of the passage.

In an example, the fluid channel may be configured to limit a dynamic of a fluid flowing through the fluid channel.

The fluid channel may be adapted to attenuate dynamics of the fluid flowing through the fluid channel. That adaption may be performed by defining the shape, the length and/or the width of the fluid channel. That adaption may then allow for tuning the pressure damping characteristics of the fluid channel. Furthermore, only a portion of the fluid channel, e.g. the portion being part of the temperature sensor case, may be adapted to attenuate the dynamics.

In a further example, the fluid channel may comprise a pressure pulsation attenuator for the fluid.

The fluid channel reduces the fluid flow area of the passage. Due to this reduced area of the fluid channel, the fluid channel can act as a pressure pulse attenuator such that pressure spikes resulting from fluid hammer effects will be attenuated when passing the fluid channel. The attenuation of those pressure pulses in the fluid reduces the risk of damaging the pressure sensor element.

In another example, the fluid channel may comprise an annular channel portion having an annular cross section extending around the temperature sensor case.

In this case, the temperature sensor case has a smaller outer diameter than the inner diameter of the passage. At positions, which are spaced apart from the position of the attachment element, the fluid channel has an annular cross-section around the temperature sensor case. The shape, the width and length of the annular channel portion may also be used to adapt the fluid channel for the attenuation of pressure pulses.

BRIEF DESCRIPTION OF THE DRAWINGS

Further features, details and advantages of the invention result from the wording of the claims as well as from the following description of exemplary embodiments based on the drawings. The figures show:

In the following description, reference sign 10 refers to the sensor arrangement in its entirety.

DETAILED DESCRIPTION

Figure 1:
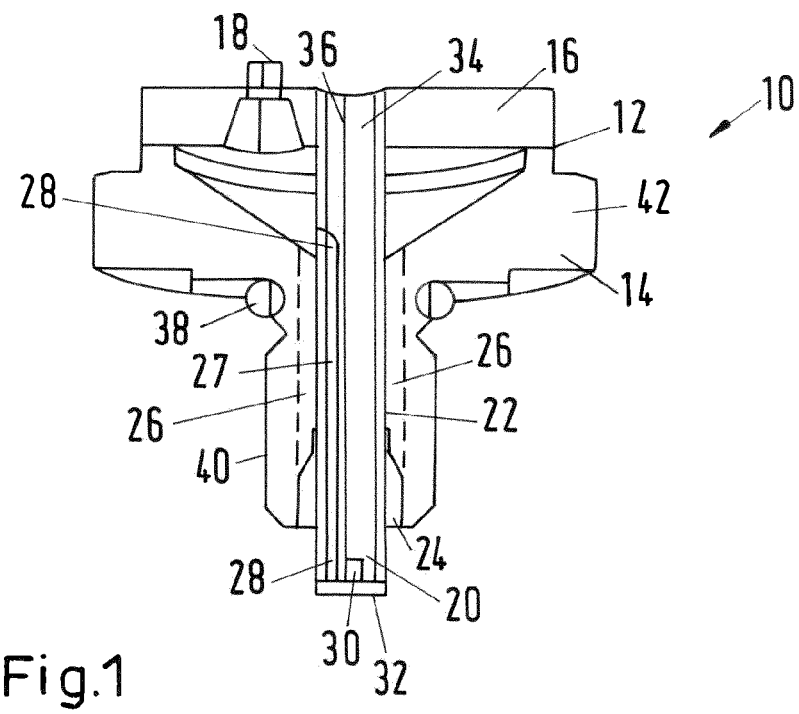
FIG. 1 a schematic drawing of the sensor arrangement.

FIG. 1 shows a cross sectional view of a sensor arrangement 10 for measuring the pressure and the temperature of a fluid. The sensor arrangement 10 comprises a housing 12, a pressure sensor element 18, a temperature sensor case 20, an attachment element 26, and a fluid channel 28.

The housing 12 comprises a fluid opening 24 and a passage 22. The housing 12 further comprises a connector element 14 having an outer threaded portion 40 and a mounting flange portion 42. The passage 22 is arranged in the connector element 14. The passage 22 extends through the connector element 14 from the fluid opening 24 to another opening being arranged on an end of the passage 22 being opposite to the fluid opening 24. A plate element 16 of the housing 12 closes that end of the passage 22. Plate element 16 may be a separate element secured to the mounting flange portion 42, or it may be formed as an integral part of housing 12.

The temperature sensor case 20 comprises a hollow sensor tube, preferably of cylindrical cross section, with an open end portion 34 and a closed end portion at a tip 32. A temperature sensor element 30, e.g. a thermistor, a thermocouple or any other suitable temperature sensor, is arranged inside the temperature case 20 at a position close to the tip 32 of the temperature sensor case 20. Electrical wires 36 connect to the temperature sensor element 30 and extend through the open end portion 34 of the temperature sensor case 20. The temperature sensor case 20 may be made of a thermally conducting material, preferably metal, to allow heat transfer from the fluid to the temperature sensor element 30. The material may be different from the material of the housing 12. Thermally conductive material, e.g. mineral powder or thermally conductive paste, is contained inside the temperature sensor case 20 to ensure optimum heat transfer between the wall of temperature case 20 and the temperature sensor element 30.

Furthermore, the temperature sensor case 20 is arranged in the passage 22, wherein the tip 32 of the temperature sensor case 20 extends out of the passage 22. However, the closed end of the temperature case 20 may also be arranged flush with the fluid opening 24 or even inside the passage 22. The open end portion 34 of the temperature sensor case 20 extends through the plate element 16. The connection between the plate element 16 and the open end portion 34 is sealed.

The attachment element 26 connects the temperature sensor case 20 to the passage 22. The temperature sensor case 20 may be connected to the attachment element 26 e.g. by press-fitting, welding, soldering or other suitable methods.

In a first exemplary embodiment, the passage 22 may comprise the attachment element 26. Therefore, the attachment element 26 may protrude from the inner wall of the passage 22 into the passage 22.

In another exemplary embodiment, the attachment element 26 may be a separate component being introduced between the temperature sensor case 20 and the passage 22 to attach the temperature sensor case 20 to the passage 22.

In another exemplary embodiment, the temperature sensor case 20 may comprise the attachment element 26. In this case, the attachment element 26 may for example be a portion of the wall of the temperature sensor case 20 protruding away from the temperature sensor case 20.

In this exemplary embodiment, the attachment element 26 is a cylindrical portion of the passage 22. The diameter of the sensor tube substantially corresponds to the diameter of the cylindrical portion of the passage 22. Thus, the temperature sensor case 20 and the attachment element 26 fill the whole diameter of the passage 22. In this exemplary embodiment, the attachment element 26 extends from a position close to the fluid opening 24 along the majority of the passage 22 towards the pressure sensor element 18.

In this exemplary embodiment, a channel portion 27 of the fluid channel 28 is formed as a recess in the wall surface of the temperature sensor case 20 facing the attachment element 26. The length of the fluid channel 28 exceeds the axial direction of the attachment element 26, so that the fluid channel 28 communicates with the fluid opening 24 and the pressure sensor element 18. The axial direction extends from the fluid opening 24 along the passage 22. The fluid channel 28 therefore circumvents the attachment element 26. A first channel portion of the fluid channel 28 extends between the passage 22 and the temperature sensor case 20. A further channel portion of the fluid channel 28 extends between the attachment element 26 and the temperature sensor case 20. The fluid channel 28 therefore bridges the position of the attachment element 26 in axial direction along the passage 22. This allows a fluid to pass through the fluid channel 28 to reach the pressure sensor element 18.

The hollow sensor tube of the temperature case 20 may also have other cross sectional shapes than circular, e.g. oval, square or rectangular shapes, adapted to the cross sections of passage 22 and/or the attachment element 16 to form the fluid channel 28.

The pressure sensor element 18 is attached to a surface of the plate element 16 facing away from the housing 12. An opening in the plate element 16 communicates the fluid from the passage 22 to the pressure sensor element 18.

The mounting flange portion 42 may comprise a sealing element 38 for sealing a connection of the sensor arrangement 10 to a fluid line.

The pressure sensor element 18 comprises at least one pressure sensitive element, e.g. a piezo-resistive, piezo-electric or capacitive sensor element. Preferably, the pressure sensor element 18 comprises a Micro-Electro-Mechanical Systems MEMS chip device, a thinfilm or a thickfilm device comprising at least one piezo-resistor.

Figure 2:
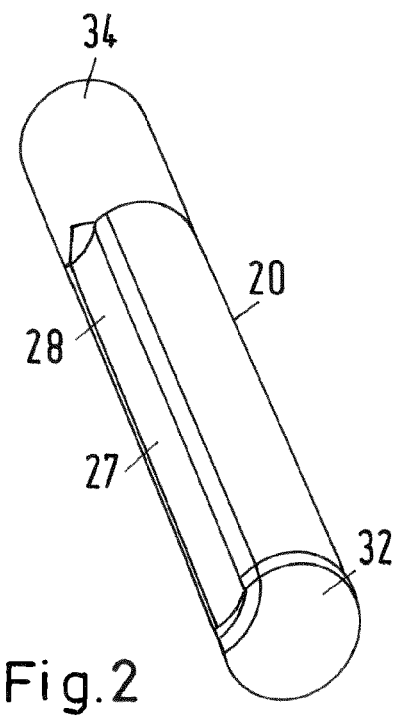
FIG. 2 a schematic drawing of the temperature sensor case comprising the fluid channel.

FIG. 2 shows the temperature sensor case 20 of the sensor arrangement 10 being shown in FIG. 1. The channel portion 27 of the fluid channel 28 may be formed as a recess by local press deformation of the temperature sensor case 20.

The fluid channel 28 extends from the tip 32 of the temperature sensor case 20 along most of the temperature sensor case 20. Furthermore, the fluid channel 28 ends close to the open end portion 34 of the temperature sensor case 20. At the position of the fluid channel 28, the temperature sensor case 20 comprises a smaller diameter than at the further positions of the temperature sensor case 20 around the axial direction.

The fluid channel 28 may also be formed as a groove into the wall of the temperature sensor case 20.

Figure 3A:
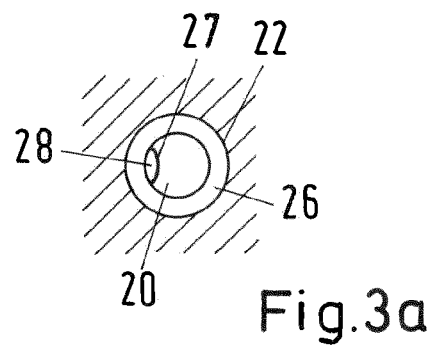
FIG. 3a, b a schematic drawing of further examples of the attachment element.
Figure 3B:
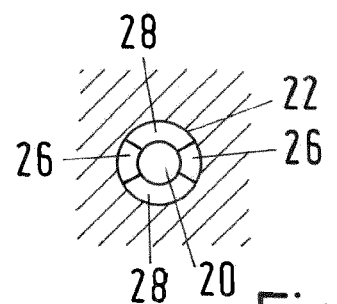

FIGS. 3a and 3b show cross-sections through the passage 22 and the temperature sensor case 20 at the position of the attachment element 26. The passage 22 and the temperature sensor case 20 extend along a normal of the figure plane.

In FIG. 3a, the exemplary embodiment of the attachment element 26 comprises an annular flange extending around the temperature sensor case 20. The annular flange of the attachment element 26 contacts the passage 22 along the complete circumference of the passage 22. Furthermore, the annular flange contacts the temperature sensor case 20 around the circumference of the temperature sensor case 20 except for the position of the fluid channel 28. In this embodiment, the channel portion 27 of the fluid channel 28 is a deformation in the wall of the temperature sensor case 20. Furthermore, the deformation may form a recess in the temperature sensor case 20. The fluid channel 28 provides a lumen at the attachment element 26 to lead a fluid around the attachment element 26 along the passage 22.

FIG. 3b shows another exemplary embodiment of the attachment element 26

The attachment element 26 in this exemplary embodiment comprises a protrusion extending between the passage 22 wall and temperature sensor case 20 wall. In this example, the attachment element 26 comprises two protrusions. The fluid channel 28 of this exemplary embodiment comprises two portions, which are arranged between the protrusions, the passage 22 and the temperature sensor case 20.

Figure 4A:
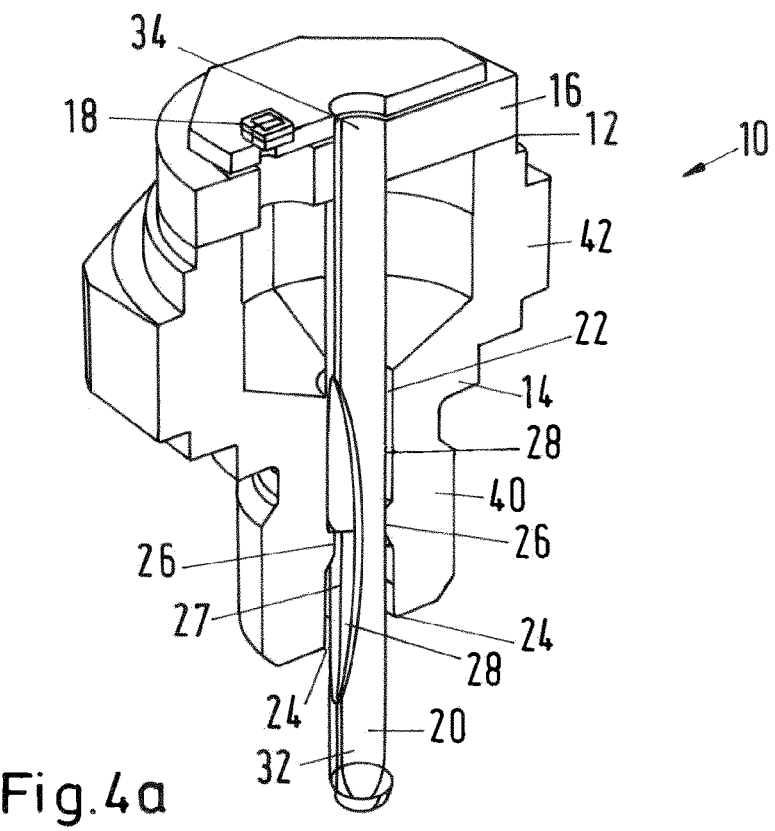
FIG. 4a, b a schematic drawing of further examples of the sensor arrangement.
Figure 4B:
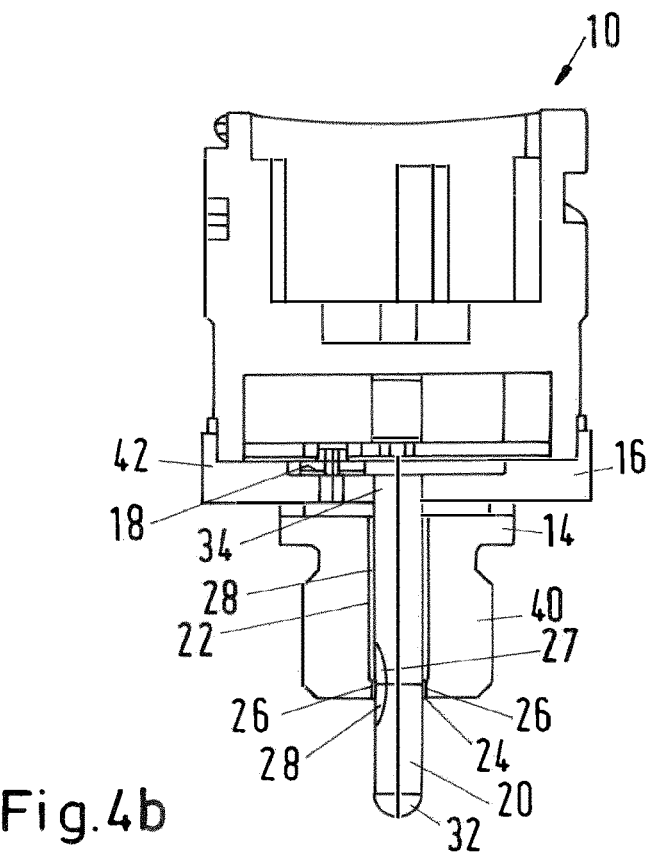

FIGS. 4a and 4b show different exemplary embodiments of the sensor arrangement 10. In FIG. 4a, the attachment element 26 extends over a length along the passage 22, which is shorter than a length of the remaining passage 22. Furthermore, the attachment element 26 is arranged between the fluid opening 24 and the pressure sensor element 18.

Thus, the attachment element 26 divides the passage 22 in an upper portion and a lower portion. The upper portion is arranged between the pressure sensor element 18 and the attachment element 26. The lower portion is arranged between the attachment element 26 and the fluid opening 24.

The fluid channel 28 is arranged at the temperature sensor case 20 and extends along the whole passage 22. Furthermore, the fluid channel 28 comprises a channel portion that is arranged at the tip 32 of the temperature sensor case 20. The tip 32 and the channel portion extend through the fluid opening 24 out of the passage 22.

FIG. 4b shows a further exemplary embodiment of the sensor arrangement 10. In this example, the attachment element 26 is arranged at the fluid opening 24. Furthermore, the attachment element 26 is shorter than the passage 22. In this example, the temperature sensor case 20 comprises a portion of the fluid channel 28 that is shorter than in the exemplary embodiment of FIG. 1 and FIG. 4a. The channel portion 27 being shaped in the temperature sensor case 20 circumvents the attachment element 26 and ends in the passage 22. The further portion of the fluid channel 28 is an annular channel portion having an annular cross-section and extending around the temperature sensor case 20.

By adjusting the shape, the size, and the length of the channel portion 27 that is provided by the temperature sensor case 20, the dynamics of the fluid flowing through the fluid channel 28 may be limited. The fluid channel 28 may therefore act as pressure pulsation attenuator for the fluid. Hammer effects in the fluid, which produce pressure spikes, may therefore be shielded from the pressure sensor element 18 by the fluid channel 28.

The invention is not limited to one of the aforementioned embodiments. It can be modified in many ways.

All features and advantages resulting from the claims, the description and the drawing, including constructive details, spatial arrangements and procedural steps, may be essential for the invention both in themselves and in various combinations.

What is claimed is:

1. A sensor arrangement for measuring the pressure and temperature of a fluid, the sensor arrangement comprising a housing, a pressure sensor element, and a temperature sensor case, wherein the housing comprises a passage and a fluid opening, the passage and the fluid opening being in fluid communication, wherein the pressure sensor element is connected to the housing, the pressure sensor element being in fluid communication with the passage, wherein the temperature sensor case comprises at least one temperature sensor element arranged inside the temperature sensor case, the temperature sensor case being at least partially arranged in the passage, wherein the sensor arrangement further comprises an attachment element, wherein the attachment element attaches the temperature sensor case to the passage, wherein the sensor arrangement further comprises a fluid channel extending at least in part between the housing and the temperature sensor case, the fluid channel passing the attachment element and being in fluid communication with the fluid opening and the pressure sensor element.

2. The sensor arrangement according to claim 1, wherein the temperature sensor case comprises at least a portion of the fluid channel.

3. The sensor arrangement according to claim 1, wherein the fluid channel comprises a channel portion being a recess on the temperature sensor case.

4. The sensor arrangement according to claim 1, wherein the fluid channel comprises a channel portion being a deformation on the temperature sensor case.

5. The sensor arrangement according to claim 1, wherein at least one portion of the fluid channel is arranged between the temperature sensor case and the attachment element, wherein at least one further portion of the fluid channel is arranged between the temperature sensor case and the passage.

6. The sensor arrangement according to claim 1, wherein the housing comprises a connector element and a plate element, wherein the passage and the fluid opening are arranged on the connector element, wherein the plate element closes the passage on an end portion of the passage, the end portion being opposite to the fluid opening, and wherein the pressure sensor element is arranged on the plate element.

7. The sensor arrangement according to claim 6, wherein the temperature sensor case extends through the plate element, wherein the temperature sensor case and the plate element comprise a sealing connection between each other.

8. The sensor arrangement according to claim 1, wherein the attachment element is an annular flange in the passage, the annular flange extending around a passage portion, wherein the temperature sensor case comprises an outer diameter that fills the passage portion.

9. The sensor arrangement according to claim 1, wherein the attachment element is arranged at the fluid opening.

10. The sensor arrangement according to claim 1, wherein the attachment element is arranged between the fluid opening and the pressure sensor element.

11. The sensor arrangement according to claim 1, wherein the fluid channel comprises a channel portion being arranged outside of the passage.

12. The sensor arrangement according to claim 1, wherein the fluid channel comprises a channel portion that is arranged on a tip of the temperature sensor case, the tip extending through the fluid opening out of the passage.

13. The sensor arrangement according to claim 1, wherein the fluid channel is configured to limit a dynamic of a fluid flowing through the fluid channel.

14. The sensor arrangement according to claim 13, wherein the fluid channel comprises a pressure pulsation attenuator for the fluid.

15. The sensor arrangement according to claim 1, wherein the fluid channel comprises an annular channel portion having an annular cross section extending around the temperature sensor case.

* * * * *

UNITED STATES PATENT AND TRADEMARK OFFICE
CERTIFICATE OF CORRECTION

| | | |
|---|---|---|
| PATENT NO. | : 12,050,144 B2 | Page 1 of 1 |
| APPLICATION NO. | : 17/635066 | |
| DATED | : July 30, 2024 | |
| INVENTOR(S) | : Mohamed Benslimane | |

It is certified that error appears in the above-identified patent and that said Letters Patent is hereby corrected as shown below:

On the Title Page

Item (54) and in the Specification, Column 1, Lines 1-3, The title "SENSOR ARRANGEMENT FOR MEASURING THE PRESSURE AND TEMPERATURE OF REFRIGERANT A FLUID" should read as --SENSOR ARRANGEMENT FOR MEASURING THE PRESSURE AND TEMPERATURE OF A REFRIGERANT FLUID--

Signed and Sealed this
First Day of October, 2024

Katherine Kelly Vidal
*Director of the United States Patent and Trademark Office*